(12) United States Patent
Chen et al.

(10) Patent No.: US 11,862,797 B2
(45) Date of Patent: Jan. 2, 2024

(54) CATHODE, ELECTROCHEMICAL DEVICE AND ELECTRONIC DEVICE INCLUDING SAME

(71) Applicant: NINGDE AMPEREX TECHNOLOGY LIMITED, Ningde (CN)

(72) Inventors: Pengwei Chen, Ningde (CN); Meng Wang, Ningde (CN); Leimin Xu, Ningde (CN); Liang Wang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 285 days.

(21) Appl. No.: 16/981,545

(22) PCT Filed: Feb. 19, 2020

(86) PCT No.: PCT/CN2020/075871
§ 371 (c)(1),
(2) Date: Sep. 16, 2020

(87) PCT Pub. No.: WO2021/163926
PCT Pub. Date: Aug. 26, 2021

(65) Prior Publication Data
US 2021/0257619 A1 Aug. 19, 2021

(51) Int. Cl.
*H01M 4/58* (2010.01)
*H01M 4/62* (2006.01)
(Continued)

(52) U.S. Cl.
CPC ......... *H01M 4/5825* (2013.01); *H01M 4/131* (2013.01); *H01M 4/505* (2013.01);
(Continued)

(58) Field of Classification Search
None
See application file for complete search history.

(56) References Cited

U.S. PATENT DOCUMENTS

2018/0241043 A1  8/2018  Miyatake et al.
2020/0144604 A1*  5/2020  Takahashi ............. H01M 4/364

FOREIGN PATENT DOCUMENTS

CN          1650450 A      8/2005
CN        102714291 A    10/2012
(Continued)

OTHER PUBLICATIONS

Korean Office Action dated Apr. 20, 2022 in counterpart Korean application KR 9-5-2022-029682412, 7 pages in Korean.
(Continued)

*Primary Examiner* — Laura Weiner
(74) *Attorney, Agent, or Firm* — Juan Carlos A. Marquez; Marquez IP Law Office, PLLC (57) ABSTRACT

A cathode includes a current collector, a first material layer and a second material layer. The first material layer includes a first material. The second material layer includes a second material. The second material includes at least one of the followings compounds: phosphate represented by a general formula $M1PO_4$ and lithium titanium phosphate represented by a general formula $Li_3Ti_{2-x} M2_x(PO_4)_3$, and the second material layer is disposed between the current collector and the first material layer. The cathode of the present application is provided with a double-layer structure including at least one of phosphate and lithium titanium phosphate to avoid direct contact between the current collector in the cathode and an anode material layer and optimize the stability of the first material layer, so that the cycle performance, electrochemical stability and safety performance of the electrochemical device are significantly improved.

16 Claims, 1 Drawing Sheet

(51) Int. Cl.
  *H01M 4/525* (2010.01)
  *H01M 4/505* (2010.01)
  *H01M 4/131* (2010.01)
  *H01M 10/0525* (2010.01)
  *H01M 4/02* (2006.01)

(52) U.S. Cl.
  CPC ........... *H01M 4/525* (2013.01); *H01M 4/621* (2013.01); *H01M 4/624* (2013.01); *H01M 10/0525* (2013.01); *H01M 2004/021* (2013.01); *H01M 2004/028* (2013.01)

(56) References Cited

FOREIGN PATENT DOCUMENTS

| | | |
|---|---|---|
| CN | 104009204 A | 8/2014 |
| CN | 105098193 A | 11/2015 |
| CN | 105428628 A | 3/2016 |
| CN | 109004170 A | 12/2018 |
| CN | 110707285 A | 1/2020 |
| JP | 2003272610 A | 9/2003 |
| JP | 2009009753 A | 1/2009 |
| JP | 2012033372 A | 2/2012 |
| JP | 2013016515 A | 1/2013 |
| JP | 2018160444 A | 10/2018 |
| JP | 2018170234 A | 11/2018 |
| KR | 20170058673 A | 5/2017 |
| KR | 20180004021 A | 1/2018 |
| WO | 2019017054 A1 | 1/2019 |
| WO | 2019058841 A1 | 3/2019 |

OTHER PUBLICATIONS

Japanese Office Action dated May 17, 2022 in counterpart Japanese application JP 2020-518549, 4 pages in Japanese.
European Search Report dated May 27, 2022 in counterpart European application EP 20 86 6936, 3 pages in English.
PCT International Search Report dated Nov. 20, 2020 in counterpart PCT application PCT/CN2020/075871, 5 pages in Chinese.
PCT Written Opinion dated Nov. 20, 2020 in counterpart PCT application PCT/CN2020/075871, 4 pages in Chinese.

* cited by examiner

CATHODE, ELECTROCHEMICAL DEVICE AND ELECTRONIC DEVICE INCLUDING SAME

CROSS REFERENCE TO RELATED APPLICATIONS

This application is a national stage application filed under 35 U.S.C. § 371, of International Patent Application No. PCT/CN2020/075871, filed on 19 Feb. 2020, which is incorporated by reference herein its entirety.

BACKGROUND

1. Technical Field

The present application relates to the technical field of energy storage, and more particularly to a cathode, an electrochemical device including the same and an electronic device.

2. Background

A cathode material is an important part of an electrochemical device (such as a lithium-ion battery) and has a significant influence on the performance of the electrochemical device. With the popularity of consumer electronics such as notebook computers, mobile phones, handheld game consoles, tablet computers, mobile power supplies and unmanned aerial vehicles, pursuing an electrochemical device with high energy density is an inevitable development trend. Using a cathode material with high energy density to improve the energy density of the electrochemical device is one of the ways to achieve high energy density. However, the cathode material with high energy density also has higher requirements for its safety performance, and the effect of improving the safety performance of the electrochemical device by only changing an electrolytic solution or an electrode assembly structure is limited.

At present, the electrochemical device with high energy density is improved generally by doping a cathode active material or coating a surface thereof, so as to change its thermal stability and structural stability. Another way is to add an inert additive or a surface additive in the electrolytic solution to maintain the cycle stability of the electrochemical device by forming an interfacial film. However, both of the above methods have the risks of lowering the kinetic performance, cycle performance and energy density of the electrochemical device.

In order to further improve the electrochemical stability, cycle performance and safety performance inside the electrochemical device, it is necessary to further improve and design the structure and material of a cathode.

SUMMARY

The present application provides a cathode, an electrochemical device including the same and an electronic device to try to solve at least one of the problems existing in the related art at least to some extent.

According to one aspect of the present application, embodiments of the present application provide a cathode, including a current collector, a first material layer and a second material layer. The first material layer includes a first material. The second material layer includes a second material. The second material includes at least one of the followings: phosphate represented by a general formula $M1PO_4$ and lithium titanium phosphate represented by a general formula $Li_3Ti_{2-x}M2_x(PO_4)_3$, wherein M1 is selected from the group consisting of Co, Mn, Fe, Ti, and combinations thereof, M2 is selected from the group consisting of V, Sc, Ge, Al, and combinations thereof, $0 \leq x < 2$, and the second material layer is disposed between the current collector and the first material layer.

According to another aspect of the present application, the embodiments of the present application provide an electrochemical device, including an anode, a separator and the above cathode.

According to another aspect of the present application, the embodiments of the present application provide an electronic device, and the electronic device includes the above electrochemical device.

Additional aspects and advantages of the embodiments of the present application will be described or shown in the following description or interpreted by implementing the embodiments of the present application.

BRIEF DESCRIPTION OF THE DRAWINGS

Drawings necessary to describe the embodiments of the present application or the prior art will be briefly illustrated so as to facilitate the description of the embodiments of the present application. Obviously, the accompanying drawings described below only show some embodiments of the present application. For those skilled in the art, the drawings of other embodiments can still be obtained according to the structures illustrated in the drawings without any creative effort.

DETAILED DESCRIPTION

The embodiments of the present application will be described in detail below. Throughout the specification, the same or similar components and components having the same or similar functions are denoted by similar reference numerals. The embodiments described herein with respect to the drawings are illustrative and graphical, and are used for providing a basic understanding of the present application. The embodiments of the present application should not be interpreted as limitations to the present application.

As used in the present application, terms "approximately", "substantially", "essentially", and "about" are used for describing and explaining a small variation. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to 0.1%, or less than or equal to ±0.05%. For example, if the difference between two numerical values is less than or equal to ±10% of the average of the values (e.g., less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two values may be considered "about" the same.

In the present application, unless otherwise particularly indicated or limited, relativistic wordings such as "central", "longitudinal", "lateral", "front", "back", "right", "left", "inner", "outer", "relatively low", "relatively high", "horizontal", "vertical", "higher than", "lower than", "above", "below", "top", "bottom", and their derived wordings (such as "horizontally", "downward", and "upward") should be construed as referenced directions described in discussion or shown in the appended drawings. These relativistic wordings are merely used for ease of description, and do not require constructing or operating the present application in a specific direction.

Further, to facilitate description, "first", "second", "third", and the like may be used in the present application to distinguish among different components in a diagram or a series of diagrams. The wordings "first", "second", "third", and the like are not intended to describe corresponding components.

In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or sub-ranges within the ranges, like explicitly specifying each value and each sub-range.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

According to one aspect of the present application, the embodiments of the present application provide a cathode which is of a multilayer structure composed of a material layer including phosphate, lithium titanium phosphate, or combinations thereof. Since the electronic conductivity of phosphate and lithium titanium phosphate is very low, by arranging the material layer including phosphate, lithium titanium phosphate or the combination thereof between a cathode active material layer and a current collector, in a charge and discharge cycle process, the material layer can well protect a high voltage of a cathode end in the charge and discharge cycle process. Moreover, phosphate and lithium titanium phosphate have stable structures under the high voltage, and therefore, the surfaces of phosphate and lithium titanium phosphate do not need to be coated with other materials (such as carbon or metallic oxides), and the oxidation situation of all layers of interfaces in the cathode under the high voltage is reduced. During safety tests such as a nailing test or an impact test, the material layer can well separate direct contact between the current collector of the cathode and an anode material layer, so that the safety performance of an electrochemical device is improved. Compared with other oxide coatings (such as aluminum oxide) in the prior art, phosphate has better processing performance and stability, so that in the whole charge and discharge processes, the cathode has a small thickness change and is not prone to falling off. In addition, the lithium intercalation potential of lithium titanium phosphate is about 2.5 V. Lithium ions are mainly intercalated into the cathode active material layer (a first material layer) in the discharge process, and the material layer (a second material layer) including lithium titanium phosphate does not participate in a lithium intercalation reaction. Therefore, the volume change and the generated reaction current density of the material layer (the second material layer) are very small, which further reduces the influence of the reaction current density difference of all the layers of interfaces on an electrical conduction system and especially reduces damage to interlayer interfaces, so that the stability of the overall impedance of the cathode is ensured. The cathode provided by the embodiments of the present application has lower initial impedance, and impedance growth under high-temperature storage can be lowered.

Figure 1:
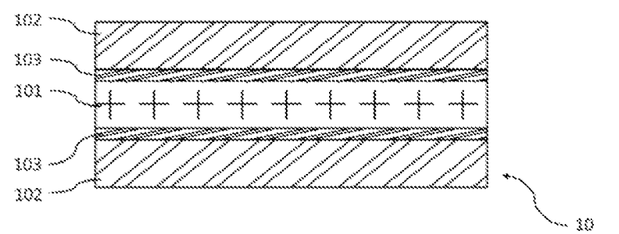
FIG. 1 is a schematic structural diagram of a cathode according to some embodiments of the present application.

FIG. 1 is a schematic structural diagram of a cathode according to some embodiments of the present application.

As shown in the FIGURE, the cathode 10 includes a current collector 101, first material layers 102 and second material layers 103. The second material layers 103 are disposed between the current collector 101 and the first material layers 102. In some embodiments, the first material layers 102 include first materials, and the second material layers 103 include second materials. The first materials and the second materials may be the same or different. The second materials include at least one of the followings: phosphate represented by a general formula $M1PO_4$ and lithium titanium phosphate represented by a general formula $Li_3Ti_{2-x}M2_x(PO_4)_3$. M1 is selected from the group consisting of Co, Mn, Fe, Ti, and combinations thereof, M2 is selected from the group consisting of V, Sc, Ge, Al, and combinations thereof, and $0 \leq x < 2$. It should be understood that although both sides of the current collector 101 of the cathode 10 in the FIGURE are provided with double-layer structures of the first material layers 102 and the second material layers 103, FIGURE is only used to illustrate exemplary embodiments of a cathode structure. Without violating the spirit of the invention of the present application, those skilled in the art may arrange the double-layer structures on a single side or both sides of the current collector 101 according to actual demands or design without limitation.

In some embodiments, the thickness of the second material layers 103 is about 2 μm to about 10 μm. The thickness of the second material layers 103 of the cathode 10 within the above range can make the second materials (phosphate or lithium titanium phosphate) be more evenly disposed on the current collector, so that an electrochemical device has better cycle performance and higher energy density. In some embodiments, the thickness of the second material layers 103 is about 3 μm to about 7 μm.

In some embodiments, the compacted density of the second material layers 103 is about 1.8 $g/cm^3$ to about 3.1 $g/cm^3$. The compacted density of the second material layers 103 within the above range can realize a relatively stable structural strength, so that the electrochemical device has better cycle performance and higher energy density. In some embodiments, the compacted density of the second material layers 103 is about 2.4 $g/cm^3$ to about 2.7 $g/cm^3$.

In some embodiments, the particle size Dv50 of the second materials is about 0.5 μm to about 5.0 μm. The particle size Dv50 of the second materials of the cathode 10 within the above range can make the second materials be more evenly disposed on the current collector. In this text, the term "Dv50" is also called "particle size", which represents a particle size starting from a small particle size side and reaching 50% of a cumulative volume in the particle size distribution of a volume basis.

It should be understood that those skilled in the art may select conventional cathode active materials in the art as the first materials according to the actual needs. In some embodiments, the first materials are selected from the group consisting of lithium cobalt oxide, lithium nickel cobalt manganese oxide, lithium nickel cobalt aluminate, lithium iron phosphate, lithium iron manganese phosphate, lithium manganese oxide, lithium-rich manganese-based material, and combinations thereof. In addition, those skilled in the art may perform cathode active material treatment well known in the art, such as transition metal element doping or inorganic oxide coating, on the first materials according to the actual needs. In some embodiments, the first materials of the present application further include transition metal doping, for example, but not limited to, elements of the group consisting of Sc, V, Cr, Mn, Fe, Cu, Zn, Y, Zr, Nb, Mo, Tc, Ru, Rh, Pd, Ag, Cd, La, Ce, Pr, Nd, Pm, Sm, Eu, Gd, Tb, Dy, Ho, Er, Tm, Yb, Lu, Al, Mg, Ti, Zr, and combinations thereof. In some embodiments, the first materials of the present application further include coating layers. The coating layers include, but are not limited to, at least one element of B, Al, Zr, C and S.

In some embodiments, the ratio of the surface densities of the second material layers 103 and the first material layers 102 in the thickness direction of the cathode is about 1% to about 5%, so that the electrochemical device has better cycle performance and higher energy density. In this text, the term "surface density" is a mass per unit area.

In some embodiments, the thickness of the first material layers 102 is about 120 μm to about 450 μm.

In some embodiments, the compacted density of the first material layers 102 is about 4.05 g/cm$^3$ to about 4.3 g cm$^3$. In some embodiments, the compacted density of the first material layers 102 is about 4.15 g/cm$^3$ to about 4.25 g/cm$^3$. In some embodiments, the particle size Dv50 of the first materials is about 2.5 μm to about 20 μm.

In some embodiments, the second material layers 103 further include at least one of binders and conductive agents.

In some embodiments, the content of the binders in the second material layers 103 is about 1 wt % to about 5 wt % of a total weight of the second material layers 103. In some embodiments, the content of the conductive agents in the second material layers is about 1 wt % to about 10 wt % of a total weight of the second material layers 103. By adding at least one of the binders and the conductive agents, the electronic conductivity and structural stability of the second material layers 103 can be adjusted, so as to improve the cycle performance and safety performance of the electrochemical device.

In some embodiments, the first material layers 102 further include at least one of binders and conductive agents.

In some embodiments, the content of the binders in the first material layers 102 is about 0.1 wt % to about 8 wt % of a total weight of the first material layers 102. In some embodiments, the content of the conductive agents in the first material layers is about 0.01 wt % to about 10 wt % of a total weight of the first material layers 102. By adding at least one of the binders and the conductive agents, the electronic conductivity and structural stability of the first material layers 102 can be adjusted, so as to improve the cycle performance and safety performance of the electrochemical device.

In some embodiments, the binders used in the first material layers 102 or the second material layers 103 may be selected from the group consisting of polyvinylidene fluoride, a copolymer of vinylidene fluoride and hexafluoropropylene, polyamide, polyacrylonitrile, polyacrylic ester, polyacrylic acid, polyacrylate, sodium carboxymethylcellulose, polyvinylpyrrolidone, polyvinyl ether, polymethyl methacrylate, polytetrafluoroethylene, polyhexafluoropropylene, styrene butadiene rubber, and combinations thereof. In some embodiments, the conductive agents used in the first material layers 102 or the second material layers 103 may be selected from the group consisting of carbon nanotubes, carbon fibers, conductive carbon black, acetylene black, graphene, Ketjen black, and combinations thereof. It should be understood that those skilled in the art may select conventional binders and conductive agents in the art according to the actual needs without limitation.

In some embodiments, a preparation method of the cathode of the present application includes the following steps:
1. The second materials, the binders and the conductive agents are mixed according to a fixed weight ratio and dissolved into a diluent solvent (N-methylpyrrolidone) to be fully mixed and stirred to form second material layer slurry, and then one or both of surfaces of the current collector are evenly coated with the second material layer slurry. After drying and cold-pressing processes, bottom diaphragms (the second material layers) are obtained.
2. Cathode materials (the first materials), the binders and the conductive agents are mixed according to a fixed weight ratio and dissolved into a diluent solvent (N-methylpyrrolidone) to be fully mixed and stirred to form first material layer slurry, and then exposed surfaces of the bottom diaphragms are evenly coated with the first material layer slurry. After drying and cold-pressing processes, the cathode with the double-layer structures is obtained.

It should be understood that the preparation method of the cathode in the embodiments of the present application may be a conventional method in the art without limitation.

Some embodiments of the present application further provide an electrochemical device including the cathode of the present application. In some embodiments, the electrochemical device is a lithium-ion battery. The lithium-ion battery includes the cathode according to the present application, an anode and a separator. The separator is disposed between the cathode and the anode.

In some embodiments, the current collector of the cathode of the present application may be an aluminum foil or a nickel foil. A current collector of the anode may be a copper foil or a nickel foil. However, other cathode and anode current collectors commonly used in the art may be adopted without limitation.

In some embodiments, the anode includes anode materials capable of absorbing and releasing lithium (Li) (hereinafter, sometimes called "anode materials capable of absorbing/releasing Li"). Examples of the anode materials capable of absorbing/releasing lithium (Li) may include carbon materials, metal compounds, oxides, sulfides, lithium nitrides such as $LiN_3$, lithium metals, metals forming alloys with lithium, and polymer materials.

In some embodiments, the separator includes, but is not limited to, at least one selected from polyethylene, polypropylene, polyethylene terephthalate, polyimide and aramid. For example, polyethylene includes at least one component selected from high-density polyethylene, low-density polyethylene, and ultra-high molecular weight polyethylene. Especially polyethylene and polypropylene play a good role in preventing a short circuit, and can improve the stability of the lithium-ion battery through a shutdown effect.

The lithium-ion battery of the present application further includes an electrolyte. The electrolyte may be one or more of a gel electrolyte, a solid electrolyte and an electrolytic solution. The electrolytic solution includes a lithium salt and a non-aqueous solvent.

In some embodiments, the lithium salt is selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB and lithium difluoroborate. For example, the $LiPF_6$ is selected as the lithium salt, because it can give a high ionic conductivity and improve cycle characteristics.

The non-aqueous solvent may be a carbonate compound, a carboxylate compound, an ether compound, other organic solvents, or combinations thereof.

The above carbonate compound may be a chain carbonate compound, a cyclic carbonate compound, a fluorocarbonate compound, or combinations thereof.

Examples of the above chain carbonate compound are diethyl carbonate (DEC), dimethyl carbonate (DMC), dipropyl carbonate (DPC), methyl propyl carbonate (MPC), ethyl propyl carbonate (EPC), methyl ethyl carbonate (MEC), and combinations thereof. Examples of the cyclic carbonate compound are ethylene carbonate (EC), propylene carbonate (PC), butylene carbonate (BC), vinyl ethylene carbonate (VEC), propyl propionate (PP), and combinations thereof. Examples of the fluorocarbonate compound are fluoroethylene carbonate (FEC), 1,2-difluoroethylene carbonate, 1,1-difluoroethylene carbonate, 1,1,2-trifluoroethylene carbonate, 1,1,2,2-tetrafluoroethylene carbonate, 1-fluoro-2-methylethylene carbonate, 1-fluoro-1-methylethylene carbonate, 1,2-difluoro-1-methylethylene carbonate, 1,1,2-trifluoro-2-methylethylene carbonate, trifluoromethylethylene carbonate, and combinations thereof.

Examples of the above carboxylate compound are methyl acetate, ethyl acetate, n-propyl acetate, tert-butyl acetate, methyl propionate, ethyl propionate, propyl propionate, γ-butyrolactone, decalactone, valerolactone, mevalonolactone, caprolactone, methyl formate, and combinations thereof.

Examples of the above ether compound are dibutyl ether, tetraethylene glycol dimethyl ether, diethylene glycol dimethyl ether, 1,2-dimethoxyethane, 1,2-diethoxyethane, ethoxymethoxyethane, 2-methyltetrahydrofuran, tetrahydrofuran, and combinations thereof.

Examples of the above other organic solvents are dimethylsulfoxide, 1,2-dioxolane, sulfolane, methylsulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, and combinations thereof.

In some embodiments, a preparation method of the lithium-ion battery includes: the cathode, the separator and the anode in the above embodiments are wound, folded or stacked into an electrode assembly in sequence. The electrode assembly is loaded into, for example, an aluminum plastic film, and an electrolytic solution is injected. Then vacuum packaging, still standing, forming, shaping and other processes are performed to obtain the lithium-ion battery.

Those skilled in the art will understand that although the above is illustrated with the lithium-ion battery, those skilled in the art can think that the cathode of the present application can be used for other suitable electrochemical devices after reading the present application. Such an electrochemical device includes any device undergoing an electrochemical reaction, and its specific examples include all kinds of primary batteries, secondary batteries, fuel batteries, solar batteries or capacitors. In particular, the electrochemical device is a lithium secondary battery, which includes a lithium metal secondary battery, a lithium-ion secondary battery, a lithium polymer secondary battery or a lithium-ion polymer secondary battery.

Some embodiments of the present application further provide an electronic device. The electronic device includes the electrochemical device in the embodiments of the present application.

The electronic device of the embodiments of the present application is not particularly defined, and may be any electronic device known in the prior art. In some embodiments, the electronic device may include, but is not limited to, a notebook computer, a pen input computer, a mobile computer, an e-book player, a portable phone, a portable fax machine, a portable copy machine, a portable printer, a stereo headphone, a video recorder, a liquid crystal display television, a portable cleaner, a portable CD player, a mini disk, a transceiver, an electronic notebook, a calculator, a memory card, a portable recorder, a radio, a backup power, a motor, a car, a motorcycle, a power assisted bicycle, a bicycle, a lighting appliance, a toy, a game console, a clock, an electric tool, a flash lamp, a camera, a large household storage battery, a lithium-ion capacitor, and the like.

SPECIFIC EXAMPLES

Some specific examples and comparative examples are listed below, and the electrochemical devices (lithium-ion batteries) are subjected to a high-temperature storage impedance test, a nailing test and an impact test respectively to better explain the technical solution of the present application.

Capacity Test:

The lithium-ion batteries of the examples and the comparative examples were put into a constant-temperature box at 25° C.±2° C., charged to 4.45 V by a constant current of 0.5 C, and then charged by a constant voltage of 4.45 V till a current was lower than 0.02 C, so that the lithium-ion batteries were in a fully charged state. After being placed for 30 minutes, the lithium-ion batteries were discharged to 3.0 V at a rate of 0.2 C. After being placed for 30 minutes, discharge capacities were taken as the actual battery capacities of the lithium-ion batteries. 5 lithium-ion batteries were taken for each group to calculate the average of the energy densities (gram capacities) of the lithium-ion batteries.

$$\frac{\text{energy density}}{\text{(gram capacity)}} = \frac{\text{discharge capacity}}{\text{total weight of first material layer and second material layer}}.$$

High-Temperature Storage Impedance Test

The lithium-ion batteries of the examples and the comparative examples were put into a constant-temperature box at 25° C.±2° C., charged to 4.45 V by a constant current of 0.5 C, and then charged by a constant voltage of 4.45 V till a current was lower than 0.02 C, so that the lithium-ion batteries were in a fully charged state. The impedance (IMP) of the lithium-ion batteries in the fully charged state was recorded as an initial impedance. Then, the lithium-ion batteries were put into an oven at 85° C.±2° C. and subjected to still standing for 6 h. After high-temperature storage, the impedance of the lithium-ion batteries was recorded as a test impedance. 5 lithium-ion batteries were taken for each group to calculate the average of high-temperature storage impedance growth rates of the lithium-ion batteries.

$$\text{high-temperature storage impedance growth rate of lithium-ion battery} = \frac{\text{test impedance} - \text{initial impedance}}{\text{initial impedance}} \times 100\%.$$

Nailing Test

The lithium-ion batteries were put into a constant-temperature box at 25° C., and subjected to still standing for 30 mins to reach a constant temperature. The lithium-ion batteries reaching the constant temperature were charged to a voltage of 4.45 V by a constant current of 0.5 C, and then charged by a constant voltage of 4.45 V till a current was lower than 0.02 C, so that the lithium-ion batteries were in a fully charged state. The lithium-ion batteries in the fully charged state were transferred onto a nailing tester. A test ambient temperature was maintained at 25° C.±2° C. Steel nails with a diameter of 4 mm were adopted to penetrate through centers of the lithium-ion batteries at a constant speed of 30 mm/s. The lithium batteries were retained for 300 seconds, and the lithium-ion batteries without smoking, fire breakout or explosion were marked as pass. 10 lithium-ion batteries were tested each time. The number of the lithium-ion batteries passing the nailing test was taken as an index of evaluating the safety performance of the lithium-ion batteries.

Impact Test

The lithium-ion batteries were put into a constant-temperature box at 25° C., and subjected to still standing for 30 mins to reach a constant temperature. The lithium-ion batteries reaching the constant temperature were charged to a voltage of 4.45 V by a constant current of 0.5 C, and then charged by a constant voltage of 4.45 V till a current was lower than 0.02 C, so that the lithium-ion batteries were in a fully charged state. The lithium-ion batteries in the fully charged state were transferred onto an impact tester. A test ambient temperature was maintained at 25° C.±2° C. Steel bars with a diameter of 15.8±0.2 mm and a length of at least 7 cm were vertically placed at the centers of the lithium-ion batteries. A steel hammer with a weight of 9.1±0.1 kg was adopted to fall down vertically and freely at a distance of 61±2.5 cm from the centers of the lithium-ion batteries to knock the steel bars so as to impact the lithium-ion batteries. After impacting, the lithium-ion batteries were retained for 300 seconds, and the lithium-ion batteries without smoking, fire breakout or explosion were marked as pass. 10 lithium-ion batteries were tested each time. The number of the lithium-ion batteries passing the impact test was taken as an index of evaluating the safety performance of the lithium-ion batteries.

Preparation of Anode

A copper foil was adopted as an anode current collector. The surface of the anode current collector was evenly coated with a layer of graphite slurry (anode material layer). The graphite slurry was composed of 95 wt % of artificial graphite, 2 wt % of acetylene black, 2 wt % of styrene butadiene rubber and 1 wt % of sodium carboxymethylcellulose. Then the anode current collector coated with the graphite slurry was baked at 120° C. for 1 h, and then cold pressing, slicing and slitting were performed to prepare the anode.

Preparation of Electrolytic Solution

Under an environment with a water content less than 10 ppm, lithium hexafluorophosphate and a non-aqueous organic solvent (ethylene carbonate (EC): propyl carbonate (PC): diethyl carbonate (DEC)=1:1:1, a mass ratio) were compounded according to a mass ratio of 8:92 to form the electrolytic solution.

Preparation of Lithium-Ion Battery

A following preparation method was adopted to prepare the cathode in the examples and the comparative examples into a lithium-ion battery. Specifically, a polyethylene film was adopted as the separator. The cathode prepared in the following examples and comparative examples was stacked with the separator and the anode according to the sequence of the cathode, the separator and the above anode. The separator was located between the cathode and the anode to play a role of separation, and then the cathode, the separator and the anode were wound into the electrode assembly. Then, the electrode assembly was loaded into an aluminum plastic film packaging bag, and a dry electrode assembly was obtained after moisture was removed at 80° C. Then, the above electrolytic solution was injected into the dry electrode assembly. The lithium-ion batteries of all the following examples and comparative examples were prepared through vacuum packaging, still standing, forming, shaping and other processes.

Example 1

Iron phosphate ($FePO_4$), with a particle size Dv50 of 1.0 µm, taken as second materials was dissolved in an N-methylpyrrolidone (NMP) solution at a weight ratio of 96:2:2 with polyvinylidene difluoride and acetylene black to form second material layer slurry. An aluminum foil was adopted as a current collector. A surface of the current collector was coated with the second material layer slurry. Bottom diaphragms (second material layers) were obtained after drying and cold pressing. The thickness of the second material layers in the bottom diaphragms was 5 µm, and the compacted density was 2.5 $g/cm^3$.

Lithium cobalt oxide (Dv50 was 12 µm), acetylene black and polyvinylidene difluoride (PVDF) were dissolved in an N-methylpyrrolidone solution according to a weight ratio of 97:2:1 to form first material layer slurry. Then exposed surfaces of the second material layers in the bottom diaphragms were coated with the first material layer slurry. A cathode was obtained after drying, cold pressing and cutting treatment. The thickness of first material layers was 300 µm, and the compacted density was 4.2 $g/cm^3$.

Example 2

The preparation mode was the same as that in Example 1. The difference was that the particle size Dv50 of iron phosphate in Example 2 was 1.5 µm.

Example 3

The preparation mode was the same as that in Example 1. The difference was that the particle size Dv50 of iron phosphate in Example 3 was 2.0 µm.

Example 4

The preparation mode was the same as that in Example 1. The difference was that the particle size Dv50 of iron phosphate in Example 4 was 2.5 µm.

Example 5

The preparation mode was the same as that in Example 1. The difference was that the particle size Dv50 of iron phosphate in Example 5 was 5.0 µm.

Example 6

The preparation mode was the same as that in Example 2. The difference was that the thickness of second material layers in Example 6 was 2 µm.

Example 7

The preparation mode was the same as that in Example 2. The difference was that the thickness of second material layers in Example 7 was 7 µm.

Example 8

The preparation mode was the same as that in Example 2. The difference was that the thickness of second material layers in Example 8 was 10 µm.

Examples 9 to 11

The preparation modes were the same as that in Example 2. The differences were that titanium phosphate ($TiPO_4$) was adopted as second materials in Example 9, manganese phosphate ($MnPO_4$) was adopted as second materials in Example 10, and cobaltous phosphate ($CoPO_4$) was adopted as second materials in Example 11.

Examples 12 to 19

The preparation modes were the same as those in Examples 1 to 8 sequentially. The differences were that lithium titanium phosphate ($Li_3Ti_2(PO_4)_3$) was adopted as second materials in Examples 12 to 19, and lithium titanium phosphate ($Li_3Ti_2(PO_4)_3$), polyvinylidene difluoride and acetylene black were dissolved in an N-methylpyrrolidone (NMP) solution according to a weight ratio of 96:2.5:1.5.

Example 20

The preparation mode was the same as that in Example 13. The difference was that lithium titanium phosphate ($Li_3Ti_2(PO_4)_3$) was adopted as second materials in Example 20, and lithium titanium phosphate ($Li_3Ti_2(PO_4)_3$), polyvinylidene difluoride and acetylene black were dissolved in an N-methylpyrrolidone (NMP) solution according to a weight ratio of 96:3:1.

Example 21

The preparation mode was the same as that in Example 13. The difference was that lithium titanium phosphate ($Li_3Ti_2(PO_4)_3$) was adopted as second materials in Example 21, and lithium titanium phosphate ($Li_3Ti_2(PO_4)_3$), polyvinylidene difluoride and acetylene black were dissolved in an N-methylpyrrolidone (NMP) solution according to a weight ratio of 96:2:2.

Examples 22 to 25

The preparation modes were the same as that in Example 13. The differences were that vanadium-doped lithium titanium phosphate ($L_3Ti_{1.99}V_{0.01}(PO_4)_3$) was adopted as second materials in Example 22, scandium-doped lithium titanium phosphate ($Li_3Ti_{1.99}Sc_{0.01}(PO_4)_3$) was adopted as second materials in Example 23, germanium-doped lithium titanium phosphate ($L_3Ti_{1.99}Ge_{0.01}(PO_4)_3$) was adopted as second materials in Example 24, and aluminum-doped lithium titanium phosphate ($Li_3Ti_{1.99}Al_{0.01}(PO_4)_3$) was adopted as second materials in Example 25.

Comparative Example 1

Lithium cobalt oxide, acetylene black and polyvinylidene difluoride were dissolved in an N-methylpyrrolidone solution according to a weight ratio of 97:2:1 to form first material layer slurry. An aluminum foil was adopted as a current collector. A surface of the current collector was directly coated with the first material layer slurry. A cathode was obtained after drying, cold pressing and cutting treatment.

Comparative Example 2

The preparation mode was the same as that in Example 1. The difference was that lithium iron phosphate ($LiFePO_4$) was adopted as second materials in Comparative Example 2.

Comparative Example 3

The preparation mode was the same as that in Example 2. The difference was that the thickness of second material layers in Comparative Example 3 was 2 µm.

Comparative Example 4

The preparation mode was the same as that in Example 13. The difference was that the thickness of second material layers in Comparative Example 4 was 2 µm.

Comparative Example 5

The preparation mode was the same as that in Example 2. The difference was that aluminum oxide ($Al_2O_3$), with a particle size Dv50 of 0.2 µm, taken as second materials in Comparative Example 5 was dissolved in an N-methylpyrrolidone (NMP) solution with polyvinylidene difluoride and acetylene black according to a weight ratio of 96:2:2.

The thickness, width, length and weight of the cathode in the above examples and comparative examples were measured. The compacted density of the first material layers or the second material layers and the ratio of the surface densities of the second material layers and the first material layers 102 along a surface of the cathode were recorded. Then the lithium-ion batteries were subjected to the high-temperature storage impedance test, the nailing test and the impact test, and test results thereof were recorded.

Statistic numerical values of the first material layers and the second material layers of Examples 1 to 25 and Comparative Examples 1 to 5 are shown in Table 1 below.

TABLE 1

| Example/ Comparative Example | Type of second material | Particle size DV50 of second material (μm) | Thickness of second material layer (μm) | Surface density ratio of second material layer and first material layer | Content of conductive agent of second material layer (wt %) |
|---|---|---|---|---|---|
| Example 1 | FePO$_4$ | 1.0 | 5 | 2% | 2.0 |
| Example 2 | FePO$_4$ | 1.5 | 5 | 2% | 2.0 |
| Example 3 | FePO$_4$ | 2.0 | 5 | 2% | 2.0 |
| Example 4 | FePO$_4$ | 2.5 | 5 | 2% | 2.0 |
| Example 5 | FePO$_4$ | 5 | 5 | 2% | 2.0 |
| Example 6 | FePO$_4$ | 1.5 | 2 | 2% | 2.0 |
| Example 7 | FePO$_4$ | 1.5 | 7 | 2% | 2.0 |
| Example 8 | FePO$_4$ | 1.5 | 10 | 2% | 2.0 |
| Example 9 | TiPO$_4$ | 1.5 | 5 | 2% | 2.0 |
| Example 10 | MnPO$_4$ | 1.5 | 5 | 2% | 2.0 |
| Example 11 | CoPO$_4$ | 1.5 | 5 | 2% | 2.0 |
| Example 12 | Li$_3$Ti$_2$(PO$_4$)$_3$ | 1.0 | 5 | 2% | 1.5 |
| Example 13 | Li$_3$Ti$_2$(PO$_4$)$_3$ | 1.5 | 5 | 2% | 1.5 |
| Example 14 | Li$_3$Ti$_2$(PO$_4$)$_3$ | 2.0 | 5 | 2% | 1.5 |
| Example 15 | Li$_3$Ti$_2$(PO$_4$)$_3$ | 2.5 | 5 | 2% | 1.5 |
| Example 16 | Li$_3$Ti$_2$(PO$_4$)$_3$ | 5 | 5 | 2% | 1.5 |
| Example 17 | Li$_3$Ti$_2$(PO$_4$)$_3$ | 1.5 | 3 | 2% | 1.5 |
| Example 18 | Li$_3$Ti$_2$(PO$_4$)$_3$ | 1.5 | 7 | 2% | 1.5 |
| Example 19 | Li$_3$Ti$_2$(PO$_4$)$_3$ | 1.5 | 10 | 2% | 1.5 |
| Example 20 | Li$_3$Ti$_2$(PO$_4$)$_3$ | 1.5 | 5 | 2% | 1.0 |
| Example 21 | Li$_3$Ti$_2$(PO$_4$)$_3$ | 1.5 | 5 | 2% | 2.0 |
| Example 22 | Li$_3$Ti$_{1.99}$V$_{0.01}$(PO$_4$)$_3$ | 1.5 | 5 | 2% | 1.5 |
| Example 23 | Li$_3$Ti$_{1.99}$Sc$_{0.01}$(PO$_4$)$_3$ | 1.5 | 5 | 2% | 1.5 |
| Example 24 | Li$_3$Ti$_{1.99}$Ge$_{0.01}$(PO$_4$)$_3$ | 1.5 | 5 | 2% | 1.5 |
| Example 25 | Li$_3$Ti$_{1.99}$Al$_{0.01}$(PO$_4$)$_3$ | 1.5 | 5 | 2% | 1.5 |
| Comparative Example 1 | N/A | N/A | N/A | N/A | N/A |
| Comparative Example 2 | LiFePO4 | 1.5 | 5 | 2% | 2.0 |
| Comparative Example 3 | FePO$_4$ | 1.5 | 2 | 2% | 2.0 |
| Comparative Example 4 | Li$_3$Ti$_2$(PO$_4$)$_3$ | 1.5 | 2 | 2% | 1.5 |
| Comparative Example 5 | Al$_2$O$_3$ | 1.5 | 5 | 2% | 2.0 |

The test results of the lithium-ion batteries of Examples 1 to 11 and Comparative Examples 1 to 3 and 5 passing the high-temperature storage impedance test, the nailing test and the impact test are shown in Table 2 below.

TABLE 2

| Example/ Comparative Example | Initial impedance (IMP)/(mΩ) | High-temperature storage impedance growth rate/% | Nailing test pass rate | Impact test pass rate |
|---|---|---|---|---|
| Example 1 | 25.7 | 21% | 10\10 | 8\10 |
| Example 2 | 27.6 | 20% | 10\10 | 8\10 |
| Example 3 | 28.6 | 18% | 10\10 | 8\10 |
| Example 4 | 29.8 | 16% | 10\10 | 8\10 |
| Example 5 | 30.3 | 15% | 10\10 | 8\10 |
| Example 6 | 26.9 | 23% | 9\10 | 8\10 |
| Example 7 | 30.6 | 19% | 10\10 | 9\10 |
| Example 8 | 33.5 | 17% | 10\10 | 10\10 |
| Example 9 | 31.5 | 24% | 10\10 | 8\10 |
| Example 10 | 36.8 | 22% | 10\10 | 9\10 |
| Example 11 | 35.9 | 19% | 10\10 | 9\10 |
| Comparative Example 1 | 30.3 | 18% | 0\10 | 1\10 |
| Comparative Example 2 | 40.6 | 68% | 8\10 | 7\10 |
| Comparative Example 3 | 24.3 | 28% | 3\10 | 1\10 |
| Comparative Example 5 | 62.4 | 39% | 2\10 | 2\10 |

The test results of the lithium-ion batteries of Examples 12 to 25 and Comparative Examples 1 to 2 and 4 to 5 passing the capacity test, the high-temperature storage impedance test, the nailing test and the impact test are shown in Table 3 below.

TABLE 3

| Example/ Comparative Example | Energy density (gram capacity) (mAh/g) | Initial impedance (IMP)/ (mΩ) | High-temperature storage impedance growth rate/% | Nailing test pass rate | Impact test pass rate |
|---|---|---|---|---|---|
| Example 12 | 182.0 | 27.2 | 21% | 10\10 | 10\10 |
| Example 13 | 181.5 | 28.1 | 19% | 10\10 | 10\10 |
| Example 14 | 180.8 | 30.6 | 18% | 10\10 | 10\10 |
| Example 15 | 180.1 | 31.7 | 17% | 10\10 | 9\10 |
| Example 16 | 180.0 | 32.2 | 16% | 10\10 | 9\10 |
| Example 17 | 181.3 | 25.4 | 25% | 8\10 | 7\10 |
| Example 18 | 181.9 | 32.4 | 16% | 10\10 | 10\10 |
| Example 19 | 181.9 | 31.1 | 15% | 10\10 | 10\10 |
| Example 20 | 181.3 | 32.3 | 25% | 10\10 | 9\10 |
| Example 21 | 181.7 | 27.3 | 16% | 9\10 | 8\10 |
| Example 22 | 180.7 | 27.6 | 22% | 8\10 | 7\10 |
| Example 23 | 181.7 | 29.7 | 23% | 10\10 | 10\10 |
| Example 24 | 181.2 | 30.2 | 24% | 9\10 | 9\10 |
| Example 25 | 180.2 | 34.7 | 19% | 9\10 | 8\10 |
| Comparative Example 1 | 178.5 | 30.3 | 18% | 0\10 | 1\10 |
| Comparative Example 2 | 180.5 | 40.6 | 68% | 8\10 | 7\10 |
| Comparative Example 4 | 181.0 | 22.4 | 29% | 2\10 | 3\10 |

TABLE 3-continued

| Example/ Comparative Example | Energy density (gram capacity) (mAh/g) | Initial impedance (IMP)/ (mΩ) | High-temperature storage impedance growth rate/% | Nailing test pass rate | Impact test pass rate |
|---|---|---|---|---|---|
| Comparative Example 5 | 170.0 | 62.4 | 39% | 2\10 | 2\10 |

It can be known from Tables 1 to 3 that compared with Comparative Example 1, the safety performance of the lithium-ion battery with the cathode of the present application in the examples of the present application is significantly improved. Specifically, by comparing Comparative Example 1 with Examples 1 to 25, it can be known that the pass rate of the electrochemical device with the cathode of the present application can be effectively increased in the nailing test and the impact test. It represents that the second material layers in the cathode of the present application can effectively prevent the current collector in the cathode from making contact with the anode, so that the safety performance of the lithium-ion battery is improved. Moreover, as shown in Table 3, compared with Comparative Example 1, the second materials of the lithium-ion batteries of Examples 12 to 25 of the present application further include lithium doping, which can effectively improve the energy density of the lithium-ion batteries.

By comparing Examples 1 to 5 and 12 to 16, it can be known that with the increase of the particle size of the second materials, the initial impedance of the lithium-ion batteries will also be increased, while the high-temperature storage impedance growth rate of the lithium-ion batteries will be decreased. In the present application, by controlling the particle size of the second materials, the high-temperature storage impedance growth rate of the lithium-ion batteries can be optimized under the condition that the initial impedance is kept within a lower range, so that the lithium-ion batteries have good cycle performance and high-temperature storage performance simultaneously.

By comparing Examples 13, 20 and 21, it can be known that the doping content of the conductive agents in the second material layers can affect the initial impedance and the high-temperature storage impedance growth rate of the lithium-ion batteries. The higher the doping content of the conductive agents in the second material layers is, the lower the initial impedance and the high-temperature storage impedance growth rate of the lithium-ion batteries are. However, the overhigh content of the conductive agents may decrease the pass rate of the lithium-ion batteries in the nailing and impact tests. The content of the conductive agents in the scope of the embodiments of the present application can make the lithium-ion batteries maintain the lower initial impedance and high-temperature storage impedance growth rate and maintain the pass rate of more than 90% of the nailing and impact tests.

By comparing Comparative Example 2 with Examples 2, 9 to 11, 13 and 22 to 25, it can be known that compared with the lithium-ion batteries adopting lithium iron phosphate as the second materials in Comparative Example 2, impedance growth after high-temperature storage can be effectively reduced in the lithium-ion batteries adopting phosphate as the second materials in Examples 2 and 9 to 11 and the lithium-ion batteries adopting lithium titanium phosphate as the second materials in Examples 13 and 22 to 25, and the high-temperature storage impedance growth rate is maintained below 25%. It represents that the second material layers adopting phosphate in the present application have good stability under a high-temperature and high-voltage environment, and the phenomena of expansion, deformation, falling-off, etc. are not prone to being generated. Therefore, the lithium-ion battery of the present application has the lower initial impedance and high-temperature storage impedance growth rate, so as to improve the cycle performance of the lithium-ion battery.

By comparing Comparative Examples 3 and 4 with Examples 2, 6 to 8, 13 and 17 to 19, it can be known that the thickness of the second material layers in the cathode has a significant influence on the safety performance of the lithium-ion batteries. The thickness of the second material layers of the lithium-ion batteries in Comparative Examples 3 and 4 is too low, which causes uneven distribution of phosphate and lithium titanium phosphate, and the separation effect of the second material layers on the current collector in the cathode and the anode is weakened. The structural design of the cathode of the lithium-ion battery of the present application can reduce the influence of the second material layers on the energy density and the impedance while improving the safety performance of the lithium-ion battery, so as to optimize the cycle and safety performance of the lithium-ion battery.

By comparing the above examples and the above comparative examples, it can be clearly understood that the cathode of the present application is provided with the second material layers and the double-layer structures including at least one of phosphate and lithium titanium phosphate, which further separates contact between the current collector in the cathode and the anode, so that the electrochemical stability and safety performance of the electrochemical device are significantly improved. Meanwhile, by optimizing the design of the second material layers of the cathode of the present application, the impedance of the electrochemical device and the impedance growth of the electrochemical device under the high-temperature and high-voltage environment can be reduced, so that the cycle performance is improved under the condition of optimizing the safety performance.

Throughout the specification, references to "embodiment", "part of embodiments", "one embodiment", "another example", "example", "specific example" or "part of examples" mean that at least one embodiment or example of the present application includes specific features, structures, materials or characteristics described in the embodiment or example. Thus, the descriptions appear throughout the specification, such as "in some embodiments", "in an embodiment", "in one embodiment", "in another example", "in an example", "in a particular example" or "for example", are not necessarily the same embodiment or example in the application. Furthermore, the specific features, structures, materials is or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. A cathode, comprising:
a current collector;
a first material layer comprising a first material, wherein the first material comprises lithium cobalt oxide; and a second material layer comprising a second material, wherein the second material comprises lithium titanium phosphate represented by a general formula $Li_3Ti_{2-x}M2_x(PO_4)_3$; wherein M2 is Sc, and $0<x<2$;

the second material layer being disposed between the current collector and the first material layer.

2. The cathode according to claim 1, wherein a thickness of the second material layer is 2 μm to 10 μm, and a compacted density of the second material layer is 1.8 g/cm³ to 3.1 g/cm³.

3. The cathode according to claim 1, wherein a particle size Dv50 of particles of the second material is 0.5 μm to 5.0 μm.

4. The cathode according to claim 1, wherein the cathode satisfies at least one of the following conditions:
   (1) the second material layer further comprises a binder, a content of the binder in the second material layer being 1 wt % to 5 wt % of a total weight of the second material layer; or
   (2) the second material layer further comprises a conductive agent, a content of the conductive agent in the second material layer being 1 wt % to 10 wt % of the total weight of the second material layer.

5. The cathode according to claim 1, wherein a ratio of a surface density of the second material layer to a surface density of the first material layer in a thickness direction of the cathode is 1% to 5%.

6. The cathode according to claim 1, wherein a thickness of the first material layer is 120 μm to 450 μm, a compacted density of the first material layer is 4.05 g/cm³ to 4.3 g/cm³, and a particle size Dv50 of particles of the first material is 2.5 μm to 20 μm.

7. An electrochemical device, comprising:
   an anode;
   a separator; and
   the cathode of claim 1.

8. The electrochemical device according to claim 7, wherein a thickness of the second material layer is 2 μm to 10 μm, and a compacted density of the second material layer is 1.8 g/cm³ to 3.1 g/cm³.

9. The electrochemical device according to claim 7, wherein a particle size Dv50 of particles of the second material is 0.5 μm to 5.0 μm.

10. The electrochemical device according to claim 7, wherein the cathode satisfies at least one of the following conditions:
    (1) the second material layer further comprises a binder, a content of the binder in the second material layer being 1 wt % to 5 wt % of a total weight of the second material layer; or
    (2) the second material layer further comprises a conductive agent, a content of the conductive agent in the second material layer being 1 wt % to 10 wt % of the total weight of the second material layer.

11. The electrochemical device according to claim 7, wherein a ratio of a surface density of the second material layer to a surface density of the first material layer in a thickness direction of the cathode is 1% to 5%.

12. The electrochemical device according to claim 7, wherein a thickness of the first material layer is 120 μm to 450 μm, a compacted density of the first material layer is 4.05 g/cm³ to 4.3 g/cm³, and a particle size Dv50 of particles of the first material is 2.5 μm to 20 μm.

13. An electronic device, comprising:
    the electrochemical device of claim 7.

14. The electronic device according to claim 13, wherein a thickness of the second material layer is 2 μm to 10 μm, and a compacted density of the second material layer is 1.8 g/cm³ to 3.1 g/cm³; and a particle size Dv50 of particles of the second material is 0.5 μm to 5.0 μm.

15. The electronic device according to claim 13, wherein the cathode satisfies at least one of the following conditions:
    (1) the second material layer further comprises a binder, a content of the binder in the second material layer being 1 wt % to 5 wt % of a total weight of the second material layer; or
    (2) the second material layer further comprises a conductive agent, a content of the conductive agent in the second material layer being 1 wt % to 10 wt % of the total weight of the second material layer.

16. The electronic device according to claim 13, wherein a ratio of a surface density of the second material layer to a surface density of the first material layer in a thickness direction of the cathode is 1% to 5%.

* * * * *